US012482620B2

(12) United States Patent
Hofsaess

(10) Patent No.: US 12,482,620 B2
(45) Date of Patent: Nov. 25, 2025

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 202 days.

(21) Appl. No.: 18/232,783

(22) Filed: Aug. 10, 2023

(65) Prior Publication Data

US 2024/0055205 A1 Feb. 15, 2024

(30) Foreign Application Priority Data

Aug. 12, 2022 (DE) ......................... 102022120446.4

(51) Int. Cl.
*H01H 37/54* (2006.01)
*H01H 37/04* (2006.01)

(52) U.S. Cl.
CPC ...... *H01H 37/5436* (2013.01); *H01H 37/043* (2013.01); *H01H 37/5409* (2013.01)

(58) Field of Classification Search
CPC ............. H01H 37/5436; H01H 37/043; H01H 37/5409
USPC .......................................................... 337/365
See application file for complete search history.

(56) References Cited

U.S. PATENT DOCUMENTS 3,715,699 A * 2/1973 Hire ................... H01H 37/5409 337/348
4,053,859 A * 10/1977 Hollweck .......... H01H 37/5409 337/348
4,306,211 A * 12/1981 Hofsass ................. H01H 37/54 337/380

(Continued)

FOREIGN PATENT DOCUMENTS

DE 196 09 310 A1 9/1997
DE 10 2011 119 632 B2 4/2013

(Continued)

OTHER PUBLICATIONS

English Machine Translation of German Search Report issued in DE 23189392.6 dated Jan. 19, 2024, in 10 pages.

(Continued)

*Primary Examiner* — Anatoly Vortman

(74) *Attorney, Agent, or Firm* — Knobbe, Martens, Olson & Bear, LLP

(57) ABSTRACT

A temperature-dependent switch, including a switching mechanism unit, and a switching mechanism housing including a first base body composed of electrically conductive material. The temperature-dependent switch further includes a switch housing having a second base body composed of electrically insulating material, in which the switching mechanism housing is arranged, wherein the switch housing includes a stationary contact part. The first base body of the switching mechanism housing surrounds the switching mechanism unit from a first housing side, a second housing side opposite to the first housing side, and a housing circumferential side extending between and transversely to the first and the second housing sides. The first housing side includes an opening through which a movable contact part of the switching mechanism unit interacts with the stationary contact part. The second base body surrounds the first housing side and the circumferential housing side of the switching mechanism housing.

17 Claims, 4 Drawing Sheets

(56) References Cited

U.S. PATENT DOCUMENTS

| | | | | |
|---|---|---|---|---|
| 4,470,033 | A * | 9/1984 | Hofsass | H01H 37/5427 337/365 |
| 5,615,072 | A * | 3/1997 | Hofsass | H01H 37/5427 361/105 |
| 5,828,286 | A * | 10/1998 | Hofsass | H01H 37/5427 337/380 |
| 5,864,278 | A | 1/1999 | Becher | |
| 5,867,085 | A | 2/1999 | Kruck et al. | |
| 5,877,671 | A * | 3/1999 | Hofsass | H01H 37/5427 337/380 |
| 6,724,293 | B1 * | 4/2004 | Hofsass | H01H 37/04 337/380 |
| 6,781,504 | B2 * | 8/2004 | Scott | H01H 37/043 337/380 |
| 8,536,972 | B2 * | 9/2013 | Hofsaess | H01H 37/5427 337/380 |
| 10,256,061 | B2 | 4/2019 | Neumann | |
| 10,439,196 | B2 | 10/2019 | Bourns et al. | |
| 10,861,662 | B2 * | 12/2020 | Hofsaess | H01H 37/52 |
| 10,985,552 | B2 | 4/2021 | Tada et al. | |
| 11,004,634 | B2 | 5/2021 | Namikawa | |
| 11,239,037 | B2 | 2/2022 | Namikawa | |
| 11,264,194 | B2 * | 3/2022 | Hofsaess | H01H 37/04 |
| 11,329,325 | B2 | 5/2022 | Namikawa | |
| 11,373,826 | B2 | 6/2022 | Namikawa | |
| 11,476,066 | B2 | 10/2022 | Hofsaess | |
| 11,551,895 | B2 | 1/2023 | Namikawa | |
| 11,615,930 | B2 | 3/2023 | Namikawa | |
| 11,636,991 | B2 | 4/2023 | Miyata | |
| 11,651,922 | B2 | 5/2023 | Tada et al. | |
| 2012/0286923 | A1 * | 11/2012 | Buettner | H01H 37/64 337/365 |
| 2013/0127585 | A1 | 5/2013 | Hofsaess | |
| 2013/0127586 | A1 * | 5/2013 | Hofsaess | H01H 1/58 337/365 |
| 2013/0271258 | A1 * | 10/2013 | Hofsaess | H01H 1/021 337/298 |
| 2014/0225709 | A1 * | 8/2014 | Kirch | H01H 37/5427 337/365 |
| 2015/0042443 | A1 * | 2/2015 | Mitschele | H01H 37/54 337/365 |
| 2020/0234898 | A1 | 7/2020 | Namikawa | |
| 2024/0212961 | A1 * | 6/2024 | Hofsaess | H01H 37/54 |
| 2025/0118512 | A1 * | 4/2025 | Hofsaess | H01H 37/04 |

FOREIGN PATENT DOCUMENTS

| | | | |
|---|---|---|---|
| DE | 10 2013 017 232 | A1 | 4/2015 |
| DE | 10 2019 125 453 | A1 | 3/2021 |
| EP | 0795885 | A2 | 9/1997 |
| WO | WO 2008/006385 | A1 | 1/2008 |

OTHER PUBLICATIONS

English Machine Translation of German Examination Report Issued in DE 102022120446.4 dated Mar. 14, 2023, in 5 pages.

* cited by examiner

TEMPERATURE-DEPENDENT SWITCH

CROSS-REFERENCE TO RELATED APPLICATIONS

This application claims priority from German patent application DE 10 2022 120 446.4, filed on Aug. 12, 2022. The entire content of this priority application is incorporated herein by reference.

BACKGROUND

The present disclosure relates to a temperature-dependent switch.

An exemplary temperature-dependent switch is disclosed in DE 196 09 310 A1.

Temperature-dependent switches of this type are used in a manner known per se to monitor the temperature of a device. For this purpose, for example, the switch is brought via one of its outside surfaces into thermal contact with the device to be protected, and therefore the temperature of the device to be protected influences the temperature of the switching mechanism arranged inside the switch.

The switch is typically electrically connected in series via connecting lines to the supply current circuit of the device to be protected, and therefore, below the response temperature of the switch, the supply current of the device to be protected flows through the switch.

The switch disclosed in DE 196 09 310 A1 comprises a switch housing, in the interior of which a switching mechanism is hermetically sealed. The switch housing is constructed in two parts. It comprises a lower part composed of insulating material and a cover part composed of electrically conductive material. The cover part is inserted into the lower part and held by an upper edge of the lower part. The switching mechanism is clamped between the cover part and the lower part. The switching mechanism is firstly inserted loosely into the lower part when the switch is manufactured. The cover part is then placed thereon and firmly connected to the lower part.

The temperature-dependent switching mechanism arranged in the switch housing comprises a spring snap-action disc to which a movable contact part is fastened, and also a bimetallic snap-action disc which is pulled over the movable contact part. The spring snap-action disc presses the movable contact part against a stationary mating contact, which is arranged on the inside of the switch housing on the cover part. The spring snap-action disc is supported by its outer edge on a second stationary mating contact, which is placed into the electrically insulating lower part. The electrical current thus flows from the one stationary mating contact through the movable contact part and the spring snap-action disc into the second stationary mating contact. The two stationary mating contacts are connected to respective electrical connections of the switch.

The temperature-dependent switching behaviour of the switch is essentially caused by the temperature-dependent bimetallic snap-action disc. The latter is usually formed as a multi-layered, active, sheet-like component consisting of two, three or four interconnected component parts having different thermal coefficients of expansion. In the case of bimetallic snap-action discs of this type, the connection of the individual layers of metals or metal alloys is usually integrally bonded or form-fitting and is achieved, for example, by rolling.

A bimetallic snap-action disc of this type has a first stable geometric configuration (low-temperature configuration) at low temperatures, below the response temperature of the bimetallic snap-action disc, and a second stable geometric configuration (high-temperature configuration) at high temperatures, above the response temperature of the bimetallic snap-action disc. The bimetallic snap-action disc jumps from its low-temperature configuration to its high-temperature configuration depending on the temperature in the manner of hysteresis. This process is often referred to as "snapping-over", which is also the reason for the term "snap-action disc".

If no switch-back lock is provided, the bimetallic snap-action disc snaps back into its low-temperature configuration, with the result that the switch is closed again as soon as the temperature of the bimetallic snap-action disc drops below what is referred to as the spring-back temperature of the bimetallic snap-action disc as a result of the cooling of the device to be protected.

In the event of a multiplicity of temperature-dependent switches, the bimetallic snap-action disc is preferably inserted into the switch housing as a loose individual part during the manufacturing of the switch, the bimetallic snap-action disc being, for example, pulled with a central through hole provided therein over the contact part fastened to the spring snap-action disc. Only by closing the switch housing is the bimetallic snap-action disc then fixed in its position and its position defined relative to the other components of the switching mechanism. This is also done with the switch known from DE 196 09 310 A1 mentioned at the beginning.

However, the production of such a switch, in which the bimetallic snap-action disc is used individually, has proved to be relatively cumbersome, since a plurality of steps are necessary for inserting the switching mechanism into the switch housing.

In the case of a switch disclosed in DE 10 2011 119 632 B3, the bimetallic snap-action disc is already connected beforehand (outside the switch housing) to the contact part fastened to the spring snap-action disc. For this purpose, the bimetallic snap-action disc is pulled over the contact part and then an upper collar of the contact part is folded over. As a result, not only is the spring snap-action disc fastened to the contact part, but also the bimetallic snap-action disc held captively thereon.

The switching mechanism, consisting of the bimetallic snap-action disc, the spring snap-action disc and the movable contact part, can thus be manufactured in advance as a semi-finished product, which forms a captive unit and can be stored separately as bulk material. During the manufacturing of the switch, the switching mechanism can then be inserted into the switch housing as a captive unit. This very much simplifies the production of the switch.

The spring snap-action disc is welded or soldered to the contact part of the switch disclosed in DE 10 2011 119 632 B3 in order to establish the best possible electrical contact between these two components. However, it has been shown that the welded or soldered connection between the contact part and the spring snap-action disc may break during the storage of the bulk material, especially when the switching mechanism is produced in advance as a semi-finished product. Of course, defective switches of this type can then no longer be used. However, it is problematic that defects at the switching mechanism can often only be detected after the entire switch has been installed, since functional testing of the switching mechanism is only possible when the switch is fully assembled.

SUMMARY

It is an object to provide a temperature-dependent switch, the switching mechanism of which can be produced in advance as a semi-finished product without being susceptible to damage, and with which functional testing of the switching mechanism is already possible before its final installation in the switch. In addition, the switch is intended to be able to be comparatively easy to mount, to have a low overall height and to be configured to be comparatively pressure-stable.

According to an aspect, a temperature-dependent switch is presented, which comprises the following components:

a temperature-dependent switching mechanism having a switching mechanism unit, which comprises a movable contact part coupled to a bimetallic snap-action disc, and having a switching mechanism housing, in which the switching mechanism unit is arranged and held captively therein, wherein the switching mechanism housing comprises a first base body composed of electrically conductive material;

a switch housing having a second base body composed of electrically insulating material, in which the switching mechanism housing is arranged and held captively therein, wherein the switch housing comprises a stationary contact part, which acts as a mating contact to the movable contact part;

a first connection contact part, which is electrically connected to the first base body of the switching mechanism housing; and a second connection contact part, which is electrically connected to the stationary contact part;

wherein the first base body of the switching mechanism housing surrounds the switching mechanism unit from a first housing side, a second housing side opposite the first housing side, and a housing circumferential side extending between and transversely to the first and the second housing sides, and on the first housing side comprises an opening through which the movable contact part interacts with the stationary contact part, and wherein the second base body of the switch housing surrounds the first housing side and the circumferential housing side of the switching mechanism housing.

The switch includes a switching mechanism, which comprises an additional switching mechanism housing, in which the switching mechanism unit, which comprises the bimetallic snap-action disc and the movable contact part, is held captively. The switching mechanism housing surrounds the switching mechanism unit namely both from a first housing side and from a second housing side opposite the first housing side, and also from a housing circumferential side extending between and transversely to the first and the second housing sides. The switching mechanism housing thus surrounds the switching mechanism unit from all six spatial directions at least partially in each case, and therefore the switching mechanism cannot drop out of the switching mechanism housing.

The switching mechanism, including the switching mechanism unit and including the switching mechanism housing surrounding the switching mechanism unit, can thus be produced in advance as a semi-finished product before being inserted into the switch housing. The switching mechanism, which is produced in advance as a semi-finished product, can be stored as bulk material. During this bulk material storage, the fragile components of the switching mechanism unit, in particular the bimetallic snap-action disc and the movable contact part, are protected by the switching mechanism housing. Damage to these fragile components during the bulk material storage is substantially excluded, since the fragile components of the switching mechanism unit are securely encapsulated in the switching mechanism housing.

However, the switching mechanism housing not only affords the advantage of secure storage of the switching mechanism unit arranged therein; it also enables a much simpler way of producing the temperature-dependent switch. Unlike a conventional switch housing, the switching mechanism housing which is now additionally provided is not a closed housing in which the switching mechanism is hermetically sealed, but rather a partially open housing which comprises an opening on the first housing side, through which the movable contact part is accessible from outside the switching mechanism housing. The switching mechanism can thus be inserted together with the switching mechanism housing as a unit into a simply constructed surrounding switch housing which forms the final switch housing.

While the switching mechanism housing comprises a first base body composed of electrically conductive material, the (surrounding) switch housing comprises a second base body composed of electrically insulating material. An electrically conductive, stationary contact part, which acts as a mating contact to the movable contact part and interacts with the movable contact part of the switching mechanism through the opening in the switching mechanism housing, is arranged on said electrically insulating second base body.

In the production of the temperature-dependent switch, the switching mechanism together with its switching mechanism housing can firstly be produced in advance as a semi-finished product and then inserted as a whole into the switch housing. This not only greatly simplifies the storage of the switching mechanism, but also the production of the temperature-dependent switch.

The two connection contact parts, one of which is electrically connected to the first base body of the switching mechanism housing and the other of which is electrically connected to the stationary contact part, are preferably arranged in the electrically insulating, second base body of the switch housing or are directly integrated therein. This has the advantage that, when the switching mechanism is inserted together with its switching mechanism housing, it can be connected directly to the two connection contact parts. This connection of the switching mechanism to the two connection contact parts is automatically already carried out when the switching mechanism housing is inserted into the switch housing and does not require any additional working step.

As already mentioned, the switching mechanism housing is a partially open housing. While the second housing side and the housing circumferential side of the switching mechanism housing are preferably each closed housing sides, the first housing side is only a partially closed or a partially open housing side because of the aforementioned opening.

However, the partially open first housing side of the switching mechanism housing is concealed by the electrically insulating second base body of the switch housing. This electrically insulating second base body acts as a surrounding switch housing or as a switch lower part, which at least partially surrounds the first housing side and the housing circumferential side of the switching mechanism housing.

Overall, this results in a switch that is simply constructed from relatively few components and can be produced in comparatively few working steps. The switching mechanism used in the switch can be produced in advance together with the switching mechanism housing and stored as bulk material. The housing of the switch, which consists of a switch housing and a switching mechanism housing, is comparatively pressure-stable and can nevertheless be relatively compact/space-saving.

According to a refinement, a part of the first base body that forms the second housing side of the switching mechanism housing forms a freely accessible outside of the switch.

This part of the first base body of the switching mechanism housing is not surrounded by the switch housing when the switch is completely installed. Thus, this part of the switching mechanism housing can serve as a direct electrical connection surface for the first connection contact part.

The aforementioned part of the first base body of the switching mechanism housing, which forms a freely accessible outside of the switch, preferably comprises an outwardly arched, domed or pot-shaped portion. This domed or pot-shaped portion of the switching mechanism housing preferably protrudes at least in part from the switch housing. At this juncture, the term "arched outwards" means that the domed or pot-shaped portion is arched outwards from the view of the switch housing, i.e. from the inside of the switch housing. The outside of the switch is arched convexly at this point.

This refinement of the switching mechanism housing makes the switch extremely pressure-stable. In addition, the domed or pot-shaped portion can be used very easily as the outer connection surface of the switch.

As an alternative to using the second housing side of the switching mechanism housing, which is freely accessible from the outside, as a connection for the first connection contact part, the first connection contact part can also be electrically connected in the interior of the switch housing to the first base body of the switching mechanism housing and can be guided outwards out of the switch housing through the second base body.

This has the advantage that the first connection contact part can already be integrated in advance in the switch housing, i.e. even before the switching mechanism is inserted. The first connection contact part is preferably arranged in the interior of the switch housing in such a manner that the first connection contact part automatically comes into contact with the electrically conductive first base body of the switching mechanism housing when the switching mechanism is inserted into the switch housing.

According to a further refinement, it is provided that the second connection contact part is electrically connected in the interior of the switch housing to the stationary contact part and is guided outwards out of the switch housing through the second base body This means that the second connection contact part can also already be integrated in the switch housing in advance, before the switching mechanism is inserted. The second connection contact part and the stationary mating contact are preferably arranged in the switch housing in such a way that contacting with the switching mechanism is automatically undertaken when the switching mechanism housing is inserted into the switch housing.

Since the second base body of the switch housing is composed of electrically insulating material, the two connection contact parts can be guided through the second base body without causing an electrical short circuit. Preferably, the two connection contact parts are inserted in a precisely fitting manner through corresponding openings in the second base body of the switch housing. If these openings are not configured in a precisely fitting manner, they should be sealed with additional insulating material to ensure that the interior of the switch is well sealed and that no contamination can enter the interior of the switch through the switch housing.

According to a further refinement, the switch housing, on an inner side facing the switching mechanism housing, comprises a first connection contact part receptacle, in which the first connection contact part is arranged, and a second connection contact part receptacle, in which the second connection contact part is arranged.

The first connection contact part receptacle preferably comprises a first recess in which the first connection contact part is embedded. The second connection contact part receptacle preferably comprises a second recess in which the second connection contact part is embedded.

The two connection contact part receptacles are each preferably configured as a kind of "contact nest" in which the two connection contact parts are each arranged in a protected manner. The arrangement of the two connection contact parts is in each case such that they automatically come into contact with the switching mechanism when the switching mechanism is inserted into the switch housing upon installation of the switch. The installation and electrical contacting of the switch are thus conceivably easily possible.

According to a further refinement, the first recess and the second recess lie in a common plane.

This means that the two connection nests are arranged at the same height. This simplifies the connection of the connection contact parts to the switching mechanism.

According to a further refinement, the first connection contact part at least partially surrounds the second connection contact part.

The stationary contact part, to which the second connection contact part is connected, is preferably arranged centrally in the switch housing. According to this refinement, the first connection contact part is configured as a pitch circle ring. More specifically, the first connection contact part comprises a portion which is arranged in the interior of the switch housing and is in the shape of a circular ring sector. This portion can extend along part of the inner wall circumference of the switch housing and surround the second connection contact part.

According to a further refinement, an intermediate layer part composed of electrically insulating material is arranged between the second connection contact part and the switching mechanism housing.

Said intermediate layer part makes it possible to arrange the electrically conductive first base body of the switching mechanism housing directly on the intermediate layer part. The intermediate layer part insulates the second connection contact part from the electrically conductive first base body of the switching mechanism housing.

According to a further refinement, the switching mechanism housing rests with a first housing portion, which is arranged on the first housing side, on the intermediate layer part and with a second housing portion, which is arranged on the first housing side, either directly on the first connection contact part or on the first connection contact part with the interposition of a connecting part composed of electrically conductive material.

When the switching mechanism housing is inserted into the switch housing, an electrical contact between the switching mechanism housing and the first connection contact part is thus automatically produced, while the switching mechanism housing is electrically insulated from the second connection contact part because of the intermediate layer part. A surface of the intermediate layer part preferably lies in a plane with a surface of the first connection contact part or with a surface of the connecting part (if present). The switching mechanism housing can thus be inserted into the switch housing in an even position aligned with said plane.

Preferably, the first connection contact part is electrically connected via the connecting part composed of electrically conductive material, which is arranged between the first connection contact part and the first base body of the switching mechanism housing, to the first base body of the switching mechanism housing.

Said connecting part establishes the electrical contact between the first connection contact part and the first base body of the switching mechanism housing. The connecting part is preferably already mounted in advance in the switch housing before the switching mechanism is inserted.

According to a refinement, the connecting part is L-shaped in cross section and abuts the first housing side and on the housing circumferential side of the switching mechanism housing.

Such an L-shaped cross section has the advantage that the contact surface is increased as a result. This improves the contact between the first connection contact part and the first base body of the switching mechanism housing.

According to a further refinement, an outer circumferential surface of the switching mechanism housing that is arranged on the housing circumferential side abuts an inner circumferential surface of the switch housing that is arranged in the interior of the switch housing.

Preferably, the outer circumferential surface of the switching mechanism housing lies in a precisely fitting manner on the inner circumferential surface of the switch housing. This essentially has the advantage that the switching mechanism is correctly aligned with respect to the stationary contact part when the switching mechanism housing is inserted into the switch housing. An alignment of the movable contact part of the switching mechanism relative to the stationary contact part is undertaken automatically when the switching mechanism housing is inserted into the switch housing.

According to a further refinement, a diameter of the opening is smaller than a diameter of the bimetallic snap-action disc measured parallel thereto. The bimetallic snap-action disc is thus securely held in the switching mechanism housing and cannot be detached from it even in the event of corresponding shaking.

According to a further refinement, the switching mechanism is configured so as, below a response temperature of the bimetallic snap-action disc, to keep the switch in a low-temperature position in which the switching mechanism establishes via the movable contact part an electrical connection between the first connection contact part and the second connection contact part, and, upon exceeding the response temperature, to move the switch into a high-temperature position in which the switching mechanism interrupts the electrical connection.

The bimetallic snap-action disc is preferably configured to snap over from a geometrically stable low-temperature configuration into a geometrically stable high-temperature configuration upon exceeding the response temperature, wherein the bimetallic snap-action disc is supported in its high-temperature configuration on a supporting surface, which is arranged on the first housing side of the switching mechanism housing and is formed on the first base body of the switching mechanism housing, and thereby keeps the movable contact part at a distance from the stationary contact part.

Since the switching mechanism unit, as already mentioned, is encapsulated in the switching mechanism housing and the bimetallic snap-action disc is supported in its high-temperature configuration on said supporting surface inside the switching mechanism housing, functional testing of the switching mechanism can also already be carried out even when the switching mechanism is produced in advance as a semi-finished product, i.e. even before the switching mechanism is installed in the switch housing and the switch is completely installed. The bimetallic snap-action disc can namely already take up its two temperature-dependent configurations inside the switching mechanism housing.

This is not possible in the case of conventional switches, since the bimetallic snap-action disc is supported in its high-temperature configuration on the switch housing owing to the absence of the now specially provided switching mechanism housing, and therefore functional testing is only possible when the switch is fully installed.

According to a further refinement, the switching mechanism unit further comprises a spring snap-action disc which is coupled to the movable contact part and is supported in the low-temperature position of the switch on an internal surface arranged on the second housing side in the interior of the switching mechanism housing. Said inner surface is preferably an inner surface of the electrically conductive first base body of the switching mechanism housing.

The additional provision of such a spring snap-action disc has in particular the advantage that the bimetallic snap-action disc is relieved of load as a result. In the low-temperature configuration of the switch, i.e. when the current circuit is closed via the switch, the spring snap-action disc serves as a live component according to this refinement. The bimetallic snap-action disc, on the other hand, is then not a live component.

In addition, in the low-temperature position of the switch, the spring snap-action disc generates the closing pressure with which the movable contact part is pressed against the stationary contact part. The bimetallic snap-action disc, on the other hand, can be mounted virtually without any force in the low-temperature position of the switch. This has a positive effect on the service life of the bimetallic snap-action disc and ensures that the switching point, i.e. the response temperature of the bimetallic snap-action disc, does not change even after many switching cycles.

It is understood that the features mentioned above and the features yet to be discussed below may be used not only in the respectively specified combination but also in other combinations or individually without departing from the spirit and scope of the present disclosure.

DESCRIPTION OF PREFERRED EMBODIMENTS

Figure 1:
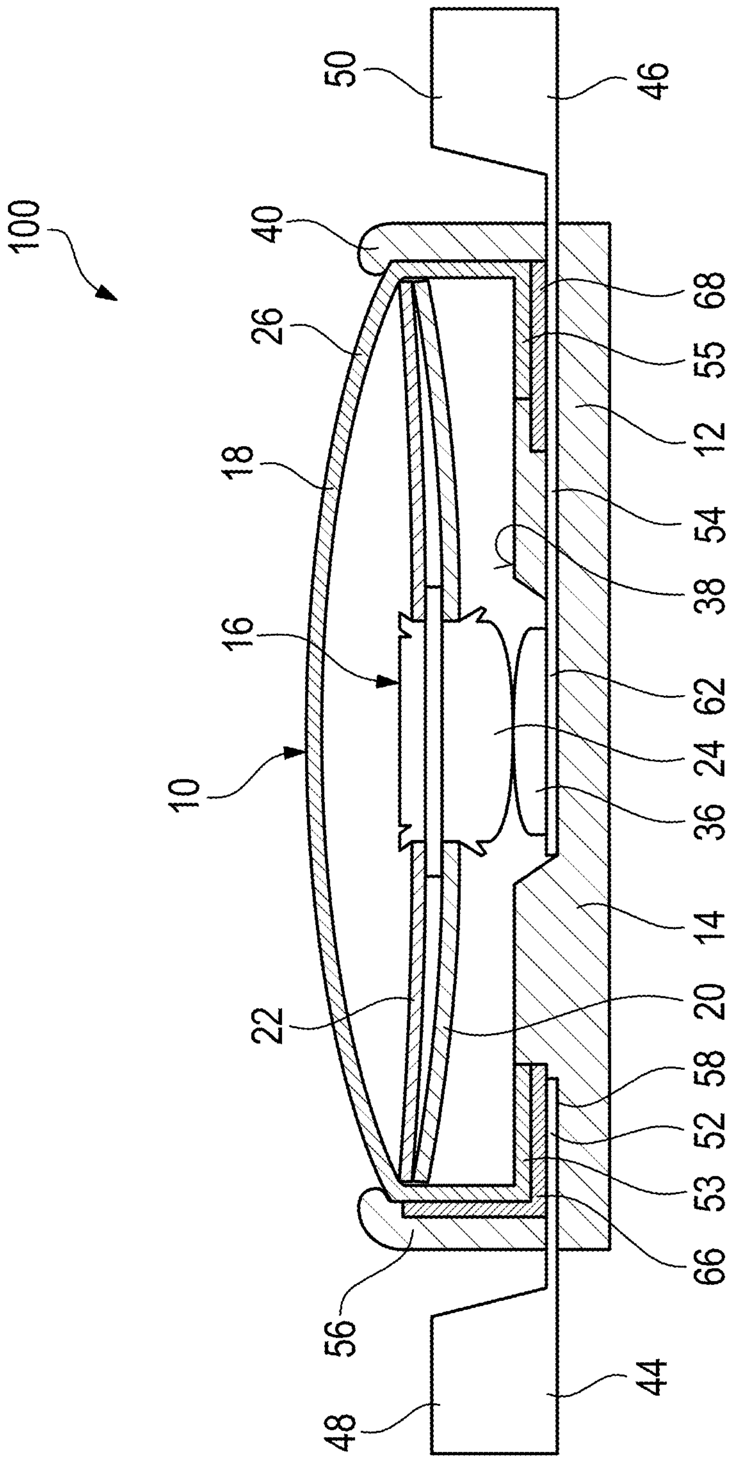
FIG. 1 shows a schematic sectional view of the temperature-dependent switch according to an exemplary embodiment, the switch being shown in its low-temperature position.
Figure 2:
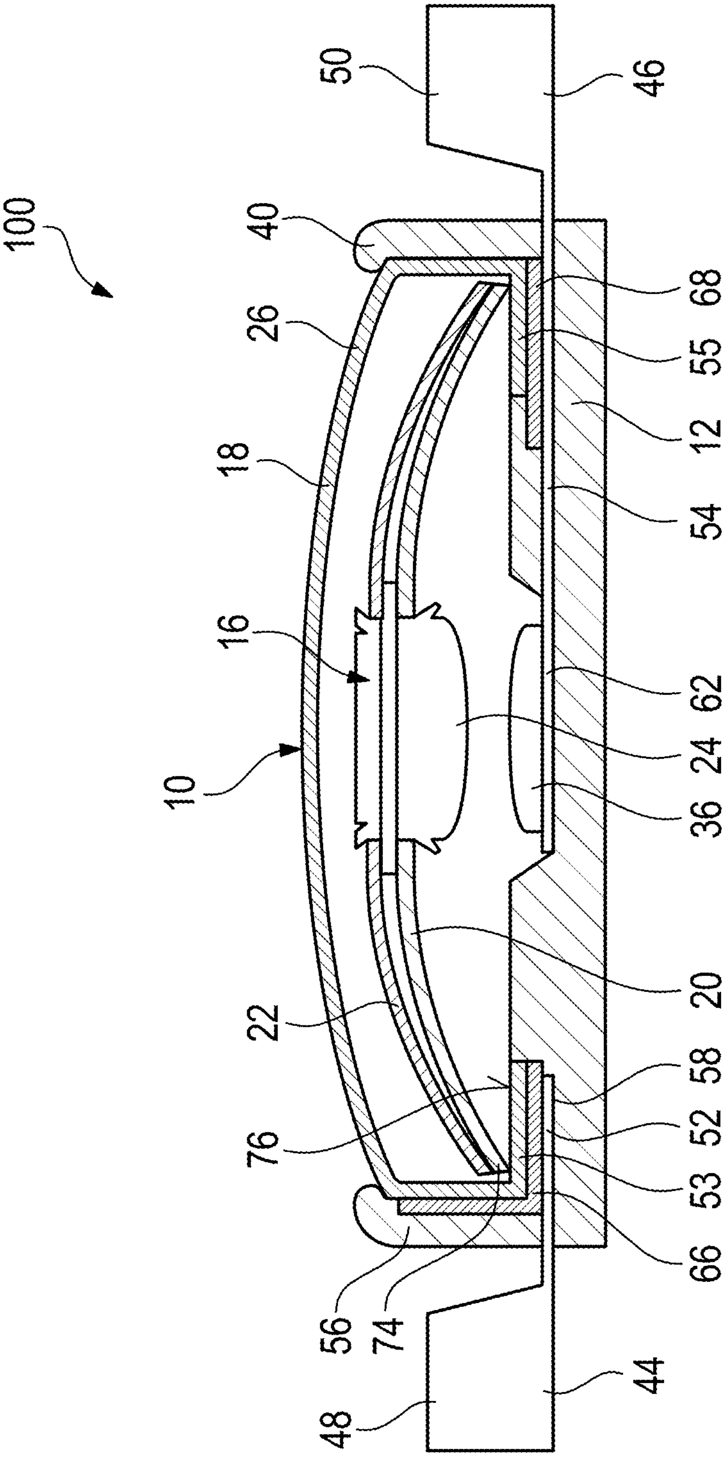
FIG. 2 shows a schematic sectional view of the switch shown in FIG. 1, the switch being shown in its high-temperature position.

FIGS. 1-2 show an exemplary embodiment of the switch in each case in a schematic sectional view. The switch is identified therein in its entirety by the reference number 100.

FIG. 1 shows the low-temperature position of the switch 100. FIG. 2 shows the high-temperature position of the switch 100.

The switch 100 comprises a temperature-dependent switching mechanism 10, which is arranged in a switch housing 12. The switch housing 12 comprises a base body 14 (in the present case referred to as "second base body") composed of insulating material, e.g. composed of plastic. This base body 14 forms the lower part of the switch 100.

The switching mechanism 10 comprises a functional switching mechanism unit 16 and a switching mechanism housing 18 surrounding said switching mechanism unit 16. The switching mechanism housing 18 at least partially surrounds the switching mechanism unit 16 from all six spatial directions. However, as explained in detail below, the switching mechanism housing 18 is configured as a partially open housing, and therefore the switching mechanism unit 16 is accessible from outside the switching mechanism housing 18 from at least one spatial direction, preferably from only one spatial direction.

Owing to the fact that the switching mechanism housing 18 at least partially surrounds the switching mechanism unit 16 from all six spatial directions, the switching mechanism unit 16 is held captively in the switching mechanism housing 18. The switching mechanism unit 16 therefore cannot be detached from the switching mechanism housing 18.

As long as the switching mechanism 10 is not installed in the switch 100 or its switch housing 12, there is preferably a certain clearance between the switching mechanism unit 16 and the switching mechanism housing 18. However, the switching mechanism unit 16 is firmly braced in the installation state of the switch 100 that is shown in FIG. 1. In the low-temperature position of the switch 100 that is shown in FIG. 1, the switching mechanism unit 16 is clamped between the switch housing 12 and the switching mechanism housing 18.

The switching mechanism unit 16 is constructed in three parts according to the present exemplary embodiment. The switching mechanism unit 16 comprises a temperature-dependent bimetallic snap-action disc 20, a temperature-independent spring snap-action disc 22 and a movable contact part 24. The bimetallic snap-action disc 20 and the spring snap-action disc 22 are held captively on the contact part 24. The switching mechanism unit 16 can thus be produced in advance as a semi-finished product and then inserted as a whole into the switching mechanism housing 18.

The switching mechanism 10 together with the switching mechanism unit 16 and the switching mechanism housing 18 also form a semi-finished product for the temperature-dependent switch 100 produced from it later on. Since the three components 20, 22, 24 of the switching mechanism unit 16 are connected captively to one other and the switching mechanism unit 16 is held captively in the switching mechanism housing 18, the switching mechanism 10 can be kept in stock as bulk material until it is installed in the temperature-dependent switch 100.

The switching mechanism housing 18 comprises a base body 26 (in the present case referred to as "first base body") composed of electrically conductive material. Said first base body 26 of the switching mechanism housing 18 surrounds the switching mechanism unit 16 from a first housing side 28, from a second housing side 30 opposite the first housing side 28, and also from a housing circumferential side 32 extending between and transversely to the first and the second housing sides 28, 30 (see FIG. 3).

Preferably, the switching mechanism housing 18 completely surrounds the switching mechanism unit 16 both from the second housing side 30 and from the housing circumferential side 32. The second housing side 30 and the housing circumferential side 32 thus preferably form closed housing sides of the switching mechanism housing 18. Only the first housing side 28 is a partially open housing side of the switching mechanism housing 18.

In other words, the housing circumferential side 32 surrounds the switching mechanism unit 16 along the entire circumference, i.e. on a total of four spatial directions oriented orthogonally with respect to one other. Furthermore, the switching mechanism housing 18 completely surrounds the switching mechanism unit 16 from a further spatial direction, namely from a spatial direction oriented orthogonally to the second housing side 30. Only from the sixth spatial direction, which is oriented orthogonally to the first housing side 28, does the switching mechanism housing 18 only partially surround the switching mechanism unit 16.

On the first housing side 28, the switching mechanism housing 18 comprises an opening 34 (see FIG. 3) through which the movable contact part 24 is accessible from outside the switching mechanism housing 18. Through said opening 34 in the switching mechanism housing 18, the movable contact part 24 of the switching mechanism 10 interacts with a stationary contact part 36, which is arranged on an inner side 38 of the switch housing 12 (see FIG. 1). A diameter of the opening 34 in the first base body 26 of the switching mechanism housing 18 is smaller than a diameter, measured parallel thereto, of the bimetallic snap-action disc 20 and/or of the spring snap-action disc 22. Thus, although the movable contact part 24 is accessible from outside the switching mechanism housing 18 through the opening 34, the bimetallic snap-action disc 20 and the spring snap-action disc 22 cannot, however, become detached from the switching mechanism housing 18 or emerge therefrom.

The first base body 26 of the switching mechanism housing 18 is composed of electrically conductive material, e.g. composed of metal. The second housing side 30 of said electrically conductive base body 26 forms a freely accessible outside of the switch 100 (see FIG. 1) in the exemplary embodiment shown here. The first housing side 28 and the housing circumferential side 32 of the switching mechanism housing 18 are arranged completely within the switch housing 12 and are therefore not accessible from outside the switch 100.

Figure 3:
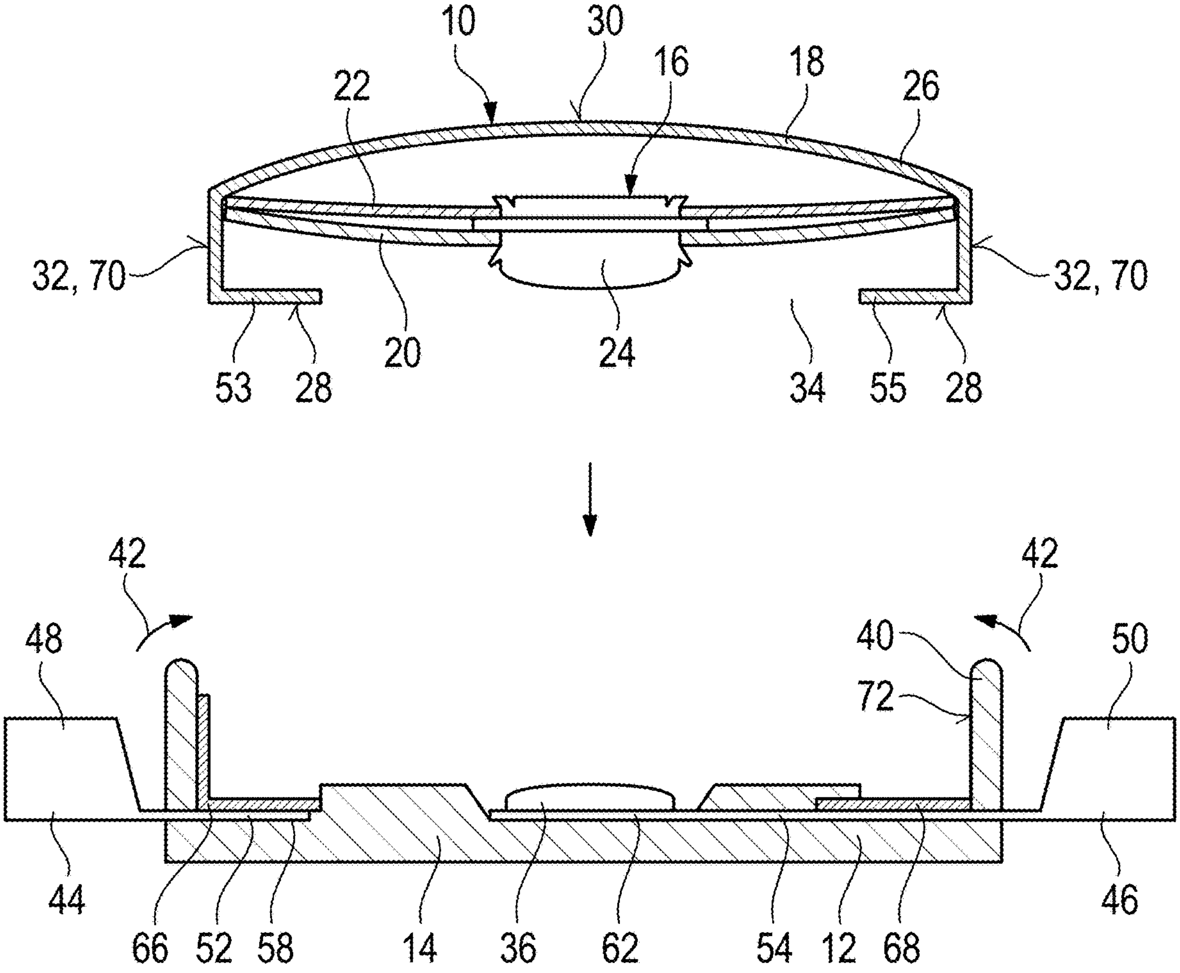
FIG. 3 shows a schematic sectional view illustrating a processing step during the manufacturing of the temperature-dependent switch according to the exemplary embodiment shown in FIG. 1.

The opening 34 arranged on the first housing side 28 in the switching mechanism housing 18 is completely concealed by the second base body 14 of the switch housing 12 when the switch 100 is installed. The switching mechanism housing 18 is arranged in the switch housing 12 and held captively thereon. For this purpose, during the manufacturing of the switch 100, an upper circumferential edge 40 is pressed radially inwards onto the switching mechanism housing 18. This process, which is schematically indicated by means of the arrows 42 in FIG. 3, is preferably carried out by means of a hot stamping process. The interfaces between the upper edge 40 of the base body 14 of the switch housing 12 and the base body 26 of the switching mechanism housing 18 can be additionally sealed by means of further sealing agents, e.g. with the aid of a sealing varnish. Thus, the switching mechanism unit 16 is hermetically sealed to the outside in the interior of the switch 100. Therefore, liquids or other contaminants do not enter the interior of the switch.

Before the switch housing 12 is connected to the switching mechanism housing 18 and sealed, the switching mechanism housing as a whole with the switching mechanism unit 16 located therein, as shown in FIG. 3, is inserted into the switch housing 12. The corresponding contacts for the electrical connection of the switching mechanism are already pre-assembled in the switch housing 12, and therefore the switching mechanism 10 does not have to be connected separately, and instead the electrical connection thereof is automatically already undertaken when the switching mechanism housing 18 is inserted into the switch housing 12.

Figure 4:
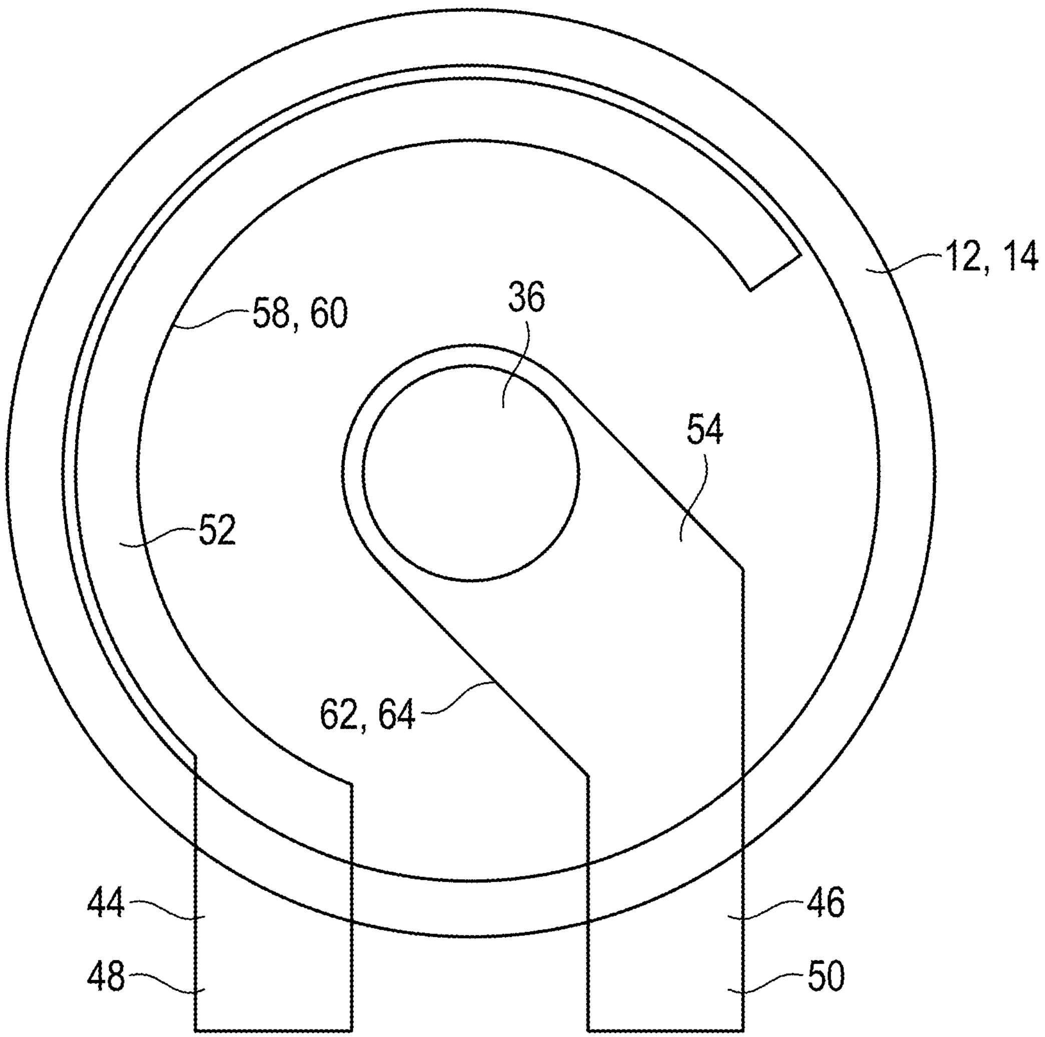
FIG. 4 shows a schematic top view from above of the switch housing of the temperature-dependent switch according to the exemplary embodiment shown in FIG. 1.

There are two connection contact parts 44, 46 on the switch housing 12. The two connection contact parts 44, 46 each comprise a cable lug 48, 50 and a connecting conductor 52, 54 connected to the cable lug 48, 50. The connecting conductor 52 of the first connection contact part 44 is electrically connected to the electrically conductive first base body 26 of the switching mechanism housing 18 in the interior of the switch 100. The connecting conductor 54 of the second connection contact part 46 is electrically connected to the stationary contact part 36 in the interior of the switch 100. FIG. 4 shows the switch housing 12 provided with the two connection contact parts 44, 46 in a top view from above before the switching mechanism 10 is inserted into the switch housing 12.

The two connecting conductors 52, 54 of the connection contact parts 44, 46 are each guided from the outside through the housing wall 56 of the second base body 14 into the interior of the switch. The connecting conductor 52 of the first connection contact part 44 is arranged in a first connection contact part receptacle 58, which is configured as a first recess/depression 60 on the inside 38 of the switch housing 12. The depression 60, which forms the first connection contact part receptacle 58, is preferably configured in such a way that the connecting conductor 52 of the first connection contact part 44 is accommodated in a precisely fitting manner therein.

The connecting conductor 54 of the second connection contact part 46 is arranged in a second connection contact part receptacle 62. Said second connection contact part receptacle 62 is configured as a second depression 64, which is introduced into the inside 38 of the electrically insulating base body 14 of the switch housing 12.

The recesses/depressions 60, 64, which form the two connection contact part receptacles 58, 62, preferably lie in a common plane. The first recess 58 at least partially surrounds the second depression 64 (see FIG. 4).

The first depression 60 and the first connecting conductor 52 have the shape of a circular ring sector, as viewed in the top view (see FIG. 4). The second depression 64 and the second connecting conductor 54 arranged therein, on the other hand, can be rectilinear or, as shown in FIG. 4, angled.

The connecting conductor 52 of the first connection contact part 44 is connected to the switching mechanism housing 18 via a connecting part 66 in the installed state of the switch 100. This connecting part 66 is a component composed of electrically conductive material, which establishes the electrical contact between the first connection contact part 44 and the electrically conductive base body 26 of the switching mechanism housing 18. The switching mechanism housing 18 rests with a second housing portion 53 on the first connection contact part 44. In the exemplary embodiment shown here, said connecting part 66 is L-shaped, as viewed in cross section, in order to be able to provide as large an electrical contact surface as possible. The connecting part 66 rests directly on the upper side of the first connecting conductor 52.

In principle, this connecting part 66 is not absolutely necessary, since the first connecting conductor 52 of the first connection contact part 44 can also be connected directly to the base body 26 of the switching mechanism housing 18. However, the connecting part 66 also has the advantage that a relatively simple height compensation is possible therewith.

The last-mentioned height compensation is particularly necessary because an intermediate layer part 68 is arranged between the connecting conductor 54 of the second connection contact part 46 and the base body 26 of the switching mechanism housing 18. Said intermediate layer part 68 is composed of electrically insulating material. It provides electrical insulation of the switching mechanism housing 18 in relation to the second connection contact part 46. The switching mechanism housing 18 rests with a first housing portion 55 on the intermediate layer part 68.

The upper side of the connecting part 66 preferably lies in a plane with the upper side of the intermediate layer part 68, and therefore the switching mechanism housing 18 rests flat with its first housing side 28 on the two parts 66, 68.

In the installed state of the switch 100, an outer circumferential surface 70 arranged on the housing circumferential side 32 of the switching mechanism housing 18 abuts an inner circumferential surface 72 arranged in the interior of the switch housing 12 (see FIGS. 1 and 3). Preferably, the outer circumferential surface 70 lies in a precisely fitting manner on the inner circumferential surface 72. The switching mechanism 10 is thus already automatically aligned correctly with respect to the stationary contact part 36 on being inserted into the switch housing 12. More specifically, during the installation of the switch 100, the movable contact part 24 of the switching mechanism 10 is aligned with respect to the stationary contact part 36.

In the low-temperature position of the switch 100 that is shown in FIG. 1, the electrical current flows, i.e. from the first connection contact part 44 via the electrically conductive base body 26 of the switching mechanism housing 18, the spring snap-action disc 22, the movable contact part 24 and the stationary contact part 36 to the second connection contact part 46.

In the low-temperature position of the switch 100, the temperature-independent spring snap-action disc 22 is in its first configuration and the temperature-dependent bimetallic snap-action disc 20 is in its low-temperature configuration. The spring snap-action disc 22 presses the movable contact part 24 against the stationary contact part 36, which acts as a mating contact. The switch 100 is thus in its closed position, in which an electrically conductive connection between the two connection contact parts 44, 46 is produced.

The contact pressure between the movable contact part 24 and the stationary contact part 36 is produced by the spring snap-action disc 22. In this state, by contrast, the bimetallic snap-action disc 20 is mounted virtually without any force in the switching mechanism housing 18.

If the temperature of the device to be protected and thus the temperature of the switch 100 and of the bimetallic snap-action disc 20 arranged therein increases to the switching temperature of the bimetallic snap-action disc 20 or above the switching temperature, the bimetallic snap-action disc 20 snaps over from its concave low-temperature position shown in FIG. 1 into its convex high-temperature position shown in FIG. 2. During said snapping-over, the bimetallic snap-action disc 20 is supported with its outer edge 74 on a supporting surface 76 arranged on the first housing side 28 of the switching mechanism housing 18 (see FIG. 2). This means that the spring snap-action disc 22 is simultaneously deflected upwards at its center such that the spring snap-action disc 22 snaps over from its first stable geometric configuration shown in FIG. 1 into its second geometrically stable configuration shown in FIG. 2.

FIG. 2 shows the high-temperature position of the switch 100, in which the latter is open. The current circuit is therefore interrupted.

When the device to be protected and thus the switch 100 together with the bimetallic snap-action disc 20 then cool again, the bimetallic snap-action disc 20 snaps over again into its low-temperature position when the switching-back temperature, which is also referred to as the return temperature, is reached, as is shown for example in FIG. 1. This allows a reversible switching behaviour to be realized.

In principle, it is also possible to provide the switching mechanism unit 16 without a spring snap-action disc 22. In such a case, the switching mechanism unit 16 then “only” comprises the bimetallic snap-action disc 20 and the movable contact part 24. The bimetallic snap-action disc 20 not only ensures the switching behaviour, but also simultaneously generates the contact pressure between the movable contact part 24 and the stationary contact part 36 in the low-temperature position of the switch 100. The bimetallic snap-action disc 20 is then used as a live component of the switching mechanism 10.

What is claimed is:

1. A temperature-dependent switch, comprising:

a temperature-dependent switching mechanism having:

a switching mechanism unit comprising a movable contact part coupled to a bimetallic snap-action disc; and a switching mechanism housing, in which the switching mechanism unit is arranged and held captively, wherein the switching mechanism housing comprises an electrically conductive first base body;

a switch housing having an electrically insulating second base body, in which the switching mechanism housing is arranged and held captively, wherein the switch housing further comprises a stationary contact part acting as a mating contact to the movable contact part;

a first connection contact part electrically connected to the electrically conductive first base body; and a second connection contact part electrically connected to the stationary contact part;

wherein the electrically conductive first base body at least partially surrounds the switching mechanism unit from a first housing side, a second housing side opposite to the first housing side, and a housing circumferential side extending between and transversely to the first and the second housing sides, wherein the electrically conductive first base body comprises, on the first housing side, an opening through which the movable contact part interacts with the stationary contact part, wherein the electrically insulating second base body surrounds the first housing side and the housing circumferential side of the switching mechanism housing, and wherein the switch housing, on an inner side facing the switching mechanism housing, comprises:

a first connection contact part receptacle, in which the first connection contact part is arranged; and a second connection contact part receptacle, in which the second connection contact part is arranged.

2. The temperature-dependent switch according to claim 1, wherein a part of the electrically conductive first base body that forms the second housing side of the switching mechanism housing forms a freely accessible outside of the switch.

3. The temperature-dependent switch according to claim 1, wherein the first connection contact part is electrically connected in an interior of the switch housing to the electrically conductive first base body and is guided outwards out of the switch housing through the electrically insulating second base body.

4. The temperature-dependent switch according to claim 1, wherein the second connection contact part is electrically connected in an interior of the switch housing to the stationary contact part and is guided outwards out of the switch housing through the electrically insulating second base body.

5. The temperature-dependent switch according to claim 1, wherein the first connection contact part receptacle comprises a first recess, in which the first connection contact part is embedded, and wherein the second connection contact part receptacle comprises a second recess, in which the second connection contact part is embedded.

6. The temperature-dependent switch according to claim 5, wherein the first recess and the second recess lie in a common plane.

7. The temperature-dependent switch according to claim 1, wherein the first connection contact part at least partially surrounds the second connection contact part.

8. The temperature-dependent switch according to claim 1, wherein an electrically insulating intermediate layer part is arranged between the second connection contact part and the switching mechanism housing.

9. The temperature-dependent switch according to claim 8, wherein the switching mechanism housing rests with a first housing portion, which is arranged on the first housing side, on the electrically insulating intermediate layer part and with a second housing portion, which is arranged on the first housing side, on the first connection contact part.

10. The temperature-dependent switch according to claim 8, wherein the switching mechanism housing rests with a first housing portion, which is arranged on the first housing side, on the electrically insulating intermediate layer part and with a second housing portion, which is arranged on the first housing side, on an electrically conductive connecting part that is interposed between the second housing portion and the first connection contact part.

11. The temperature-dependent switch according to claim 10, wherein the electrically conductive connecting part is L-shaped in cross section and abuts the first housing side and the housing circumferential side of the switching mechanism housing.

12. The temperature-dependent switch according to claim 10, wherein the first connection contact part is electrically connected to the electrically conductive first base body via the electrically conductive connecting part.

13. The temperature-dependent switch according to claim 1, wherein an outer circumferential surface of the switching mechanism housing that is arranged on the housing circumferential side abuts an inner circumferential surface of the switch housing that is arranged in an interior of the switch housing.

14. The temperature-dependent switch according to claim 1, wherein the temperature-dependent switching mechanism is configured so as, below a response temperature of the bimetallic snap-action disc, to keep the switch in a low-temperature position in which the temperature-dependent switching mechanism establishes via the movable contact part an electrical connection between the first connection contact part and the second connection contact part, and upon exceeding the response temperature, to move the switch into a high-temperature position in which the temperature-dependent switching mechanism interrupts the electrical connection.

15. The temperature-dependent switch according to claim 14, wherein the bimetallic snap-action disc is configured to snap over from a geometrically stable low-temperature configuration into a geometrically stable high-temperature configuration upon exceeding the response temperature, and wherein the bimetallic snap-action disc is supported in the geometrically stable high-temperature configuration on a supporting surface, which is arranged on the first housing side of the switching mechanism housing and is formed on the electrically conductive first base body, and thereby keeps the movable contact part at a distance from the stationary contact part.

16. A temperature-dependent switch, comprising:

a temperature-dependent switching mechanism having:

a switching mechanism unit comprising a movable contact part coupled to a bimetallic snap-action disc; and a switching mechanism housing, in which the switching mechanism unit is arranged and held captively, wherein the switching mechanism housing comprises an electrically conductive first base body;

a switch housing having an electrically insulating second base body, in which the switching mechanism housing is arranged and held captively, wherein the switch housing further comprises a stationary contact part acting as a mating contact to the movable contact part;

a first connection contact part electrically connected to the electrically conductive first base body; and a second connection contact part electrically connected to the stationary contact part;

wherein the electrically conductive first base body at least partially surrounds the switching mechanism unit from a first housing side, a second housing side opposite to the first housing side, and a housing circumferential side extending between and transversely to the first and the second housing sides, wherein the electrically conductive first base body comprises, on the first housing side, an opening through which the movable contact part interacts with the stationary contact part, wherein the electrically insulating second base body surrounds the first housing side and the housing circumferential side of the switching mechanism housing, wherein an electrically insulating intermediate layer part is arranged between the second connection contact part and the switching mechanism housing, wherein the switching mechanism housing rests with a first housing portion, which is arranged on the first housing side, on the electrically insulating intermediate layer part and with a second housing portion, which is arranged on the first housing side, on an electrically conductive connecting part that is interposed between the second housing portion and the first connection contact part, and wherein the electrically conductive connecting part is L-shaped in cross section and abuts the first housing side and the housing circumferential side of the switching mechanism housing.

17. A temperature-dependent switch, comprising:

a temperature-dependent switching mechanism having:

a switching mechanism unit comprising a movable contact part coupled to a bimetallic snap-action disc; and a switching mechanism housing, in which the switching mechanism unit is arranged and held captively, wherein the switching mechanism housing comprises an electrically conductive first base body;

a switch housing having an electrically insulating second base body, in which the switching mechanism housing is arranged and held captively, wherein the switch housing further comprises a stationary contact part acting as a mating contact to the movable contact part;

a first connection contact part electrically connected to the electrically conductive first base body; and a second connection contact part electrically connected to the stationary contact part;

wherein the electrically conductive first base body at least partially surrounds the switching mechanism unit from a first housing side, a second housing side opposite to the first housing side, and a housing circumferential side extending between and transversely to the first and the second housing sides, wherein the electrically conductive first base body comprises, on the first housing side, an opening through which the movable contact part interacts with the stationary contact part, wherein the electrically insulating second base body surrounds the first housing side and the housing circumferential side of the switching mechanism housing, wherein the temperature-dependent switching mechanism is configured so as, below a response temperature of the bimetallic snap-action disc, to keep the switch in a low-temperature position in which the temperature-dependent switching mechanism establishes via the movable contact part an electrical connection between the first connection contact part and the second connection contact part, and, upon exceeding the response temperature, to move the switch into a high-temperature position in which the temperature-dependent switching mechanism interrupts the electrical connection, wherein the bimetallic snap-action disc is configured to snap over from a low-temperature configuration into a high-temperature configuration upon exceeding the response temperature, and wherein the bimetallic snap-action disc in its high-temperature configuration contacts a supporting surface and is supported thereon, and keeps the movable contact part at a distance from the stationary contact part, the supporting surface being arranged on the first housing side of the switching mechanism housing and is formed on the electrically conductive first base body.

* * * * *